United States Patent [19]
Holland

[11] Patent Number: 5,547,313
[45] Date of Patent: Aug. 20, 1996

[54] MARINE FUELING FACILITY SPILL CONTAINMENT SYSTEM

[76] Inventor: Herbert W. Holland, 2314 Chimney Rock, Houston, Tex. 77056

[21] Appl. No.: 240,321

[22] Filed: May 10, 1994

[51] Int. Cl.$^6$ .................................................. E02B 15/04
[52] U.S. Cl. ............................ 405/63; 210/924; 405/60; 405/65
[58] Field of Search .................... 405/63–72; 210/924, 210/242.3

[56] References Cited

U.S. PATENT DOCUMENTS

| | | | |
|---|---|---|---|
| 3,539,013 | 11/1970 | Smith | 405/66 X |
| 3,702,657 | 11/1972 | Cunningham et al. | 405/71 X |
| 3,739,913 | 6/1973 | Bogosian | 210/924 X |
| 4,016,726 | 4/1977 | Campbell et al. | 405/71 |
| 4,111,813 | 9/1978 | Preus | 210/924 X |
| 4,497,712 | 2/1985 | Cowling | 210/242.4 X |
| 5,165,821 | 11/1992 | Fischer et al. | 405/63 |

FOREIGN PATENT DOCUMENTS 0148816   11/1980   Japan .......................... 405/65

OTHER PUBLICATIONS

Micro–Environmental, Inc. Printed Sep. 1991 Waste–Set PS Series Oil Solidifying Agents Brochure and Material Safety Data Sheets—Waste Set PS 3200 and 3400.
NOCHAR, Incorporated Prepared Oct. 1990 Nochar's A610 and A650 Product Brochure, Fact Sheet and Material Safety Data Sheets—Nochar A610 and Nochar A650.
Petroleum Environmental Technologies, Inc. Printed Nov. 1993 Enviro–Bond 403 Product Brochure and Material Safety Data Sheet–Enviro–Bond 403.
JRM Chemical, Inc. Printed Aug. 1993 Environmental Spill Encapsulant Polymers Brochure and Material Safety Data Sheet–H–100 Spill Encapsulant.

*Primary Examiner*—Dennis L. Taylor

[57] ABSTRACT

A system to contain, collect and remove hydrocarbons such as gasoline, diesel and/or lubricants that are spilled or leaked on to the surface of the water during fueling operations at marine fueling facilities. The system utilizes a series of absorbent devices formed as pillows and held in place on the surface of the water along the dock area of a fueling facility that absorb hydrocarbon pollutants that they come in contact with. The absorbed hydrocarbons are solidified within the pillow into a rubber-like mass. The consolidated mass is contained within the pillows, will float indefinitely and is easily retrieved and handled for disposal. Once the capacity of a pillow is reached, it will continue to act as a containment boom to keep the spill on the water's surface from spreading throughout the fueling facility area, allowing the spill to reach another pillow with the capacity to absorb and solidify the spill. A pillow that has reached its full absorbing and solidifying capacity can be easily replaced with a fresh pillow using a simple system of attaching the pillows to the periphery of the fueling facility. The solidified hydrocarbons will not leech when exposed to pressure limits used to determine landfill suitability. The solidified devices can be disposed of as landfill, incinerated as a fuel or utilized as a component in the production of asphalt, roofing materials or other tar-like compounds.

16 Claims, 6 Drawing Sheets

MARINE FUELING FACILITY SPILL CONTAINMENT SYSTEM

BACKGROUND OF THE INVENTION

The present invention relates to methods used in containing and removing leaked and spilled hydrocarbons in the marine environment.

For marine vessel fueling facilities, there is a need to remove hydrocarbons spilled or leaked on to the surface of the water as part of routine fueling operations of vessels. Spills of this nature are generated by fuel being forced out of the ventilation valve of the fuel tank of the vessel and on to the surface of the water when the fuel tank is filled to capacity. Spills also occur when fuel overflows from the fuel tank intake port of the vessel and on to the surface of the water when the fuel tank is filled to capacity during fueling operations. The task of containing these spills is necessary to prevent the hydrocarbons that are spilled or leaked on the surface of the water from spreading throughout the fueling facility area, allowing them to flow out of the containment area and polluting the adjacent waterways.

The most common method of eliminating the sheen on the water caused by these spills is to pour a dispersant such as liquid dishwashing soap on the spill. The dispersant breaks up the oily sheen into tiny particles of hydrocarbon that remain in the water and are not visible to the eye unless they are magnified. This "out of sight, out of mind" mentality is by far the most prevalent treatment of spills generated at marine fueling facilities. The use of a dispersant in this manner currently violates a number of regulations and statutes with regard to the use of dispersants in the handling of spills of this nature.

Seldom is an effort made to extract the pollutants from the surface of the water, leaving the hydrocarbons on the water to spread throughout the adjacent waterway, polluting the environment.

The prior art method of dealing with hydrocarbon spills at marine fueling facilities is extremely harmful to the marine environment immediately surrounding the fueling facility as well as posing a variety of health and safety hazards. The placement of a liquid detergent on the surface of the water to disperse the sheen does not remove the hydrocarbons from the water, it merely removes the telltale sheen from sight. The pollutants are never extracted from the water, leaving them to contaminate the area adjacent to the fueling facility. Marinelife and wildlife are effected by the pollution. The accumulation of hydrocarbons on the surface of the water renders the water unfit for drinking or swimming and presents a safety hazard. The presence of the hydrocarbon pollutants floating freely on the surface of the water creates an even greater fire hazard than that which already exists due to the handling of flammable liquids at the fueling facility. The free release of pollutants into the marine environment at marine fueling facilities poses a number of concerns that are not addressed using the present method of eliminating the sheen from the surface of the water at these facilities.

Another common approach to removing the hydrocarbon spills from the surface of the water is to use absorbent devices, typically made of a non-woven, synthetic fabric such as polypropylene, polyester or nylon. Such fabrics are petro-chemical based materials having the physical properties of absorbing liquid hydrocarbons while repelling water. These materials can be used as flat pads or sheets, rolled into long cylindrical booms or packaged in an open weave plastic net to form a sausage-like boom.

The use of absorbent devices for removing spills from the surface of the water often results in the transfer of the liquid hydrocarbon pollutants from one environment to another since the absorbent devices are subject to having the sorbed hydrocarbons released by gravity, column weight and outside forces exerting pressure on them when they are removed from the spill area. The released liquid hydrocarbons are then free to seep through the ground and enter the adjacent water column or flow downstream as waste water runoff.

SUMMARY OF THE INVENTION

In accordance with the present invention, a method of employing absorbent devices is provided which will contain and prevent the spread of hydrocarbon spills on the surface of the water in marine fueling facilities. The absorbent devices used in the system not only absorb liquid hydrocarbons, but also quickly and irreversibly solidify the absorbed liquid hydrocarbons into an easily retrievable, solid rubber-like mass. The solidified hydrocarbons will not leech when exposed to pressure limits used to determine landfill suitability. The solidified devices can be disposed of as landfill, incinerated as a fuel or utilized as a component in the production of asphalt or other paving compounds.

The device is formed as a pillow from a textile material sewn to form layered chambers in stratification contained within an outer envelope layer which defines the overall pillow shape. A length of rope is sewn into one of the sides of the outer envelope, creating a boltrope effect similar to that used in the production of sails. The boltrope is incorporated in a method of attaching the pillows to the docks and piers of the fueling facility.

A seam is placed longitudinally along the center axis of the pillow, creating two columns of stratified pockets. Additional cross-seams are placed at evenly spaced intervals laterally from one side of the pillow to the opposite side of the pillow, crossing the center axis seam of the pillow in a perpendicular or an oblique orientation to the center axis of the pillow. This seaming results in a quilting effect which produces a calculated number and arrangement of chambers containing an approximately equal amount of solidifying polymer. The design and spacing of the seams creates multiple consolidation points of the stratified layers. These consolidation points define the multiple compartmented absorption cells and act as flow channels to facilitate and hasten the migration of the spill or leak to the solidifying polymer in the compartmented absorption cells, followed by the complete absorption and solidification of the spill or leak.

The seaming of the textile material components of the device can be accomplished by a variety of methods that include mechanical stitching, thermal sealing and ultra-sonic fusing. These seaming methods are used to seal the perimeter of the pillow, produce the individual chambers of solidifying polymer and unite the stratified internal layers with the outer envelope. The joining of the layers of textile material results in a series of consolidation points of the layers of textile material and creates the flow channels throughout the body of the pillow for the migration of spills and leaks to the absorptive cells within the pillow.

The solidifying polymer can be placed in the pillow using any of several different methods. As a first example, the polymer, in its granular form, can be placed in equally measured amounts, into the open end of the pillow after three sides of the pillow have been seamed and the center longitudinal axis seam has been placed to form side-by-side elongated pockets. The inserted polymer collects at the bottom of the pocket and a cross-seam is placed to form a polymer-filled chamber. The step of introducing polymer into the open end of the pillow, then sealing it into the chambers by placing a cross-seam is repeated until all the stratified chambers have been formed to create a matrix arrangement of polymer-filled chambers stratified within the outer envelope of the pillow. The seaming to form the matrix of chambers also acts to provide the quilting effect desired for increasing the rate of migration of the hydrocarbons to the interior of the pillow by the creation of consolidation points and flow channels.

Other methods of stratifying and sealing the solidifying polymer within the outer envelope of the device can be used. One method calls for the solidifying polymer to be encased and sealed within individual bags of single layer textile material, these bags being filled and sealed in an assembly-line fashion. Each bag, filled with a measured amount of the solidifying polymer is sealed to form a solitary chamber of solidifying polymer within a single layer of textile material. Individual bags are then arranged side-by-side in a matrix configuration of rows and columns to produce a single layer of bags conforming to the designated perimeter dimensions of the finished pillow. Identical layers of the arrangement of polymer-filled bags are duplicated and then stratified over the first layer of bags to produce the required thickness of the pillow. Each layer of the arrangement of bags is positioned so the perimeter of the overall shape of the layer and the side-by-side intersections of the matrix of bags in each layer are aligned in substantial registration with the corresponding perimeter of the arrangement of bags and the side-by-side intersections of the arranged bags of the other layers. The stratified layers of individual polymer-filled bags are then enclosed within an outer envelope of textile material and sealed within the perimeter of the outer envelope. The intersections of the individual polymer-filled bags of the stratified layers are seamed to the outer envelope of the pillow, creating the longitudinal and cross-seams of the pillow used as flow channels and consolidating points of the stratified layers. The result is the required quilting effect integral to the concept.

The solidifying polymer can also be suspended within the fibers of a textile material as they are being formed, or attached to the textile material. The suspending of the polymer is accomplished by incorporating the polymer into the body of the fabric during the process used to form the textile material. This process is normally used in the production of melt-blown or spunbonded textiles.

The manufacturing of a synthetic textile fabric material starts with raw petro-chemical based pellets, such as polypropylene, being blended with pigments and/or additives. This mixture is heated to the melting point of the pellets and extruded into filaments. The filaments are drawn and attenuated, using high velocity air to align the polymer molecules and maximize fiber strength. The resulting continuous, high tenacity filaments are formed into a web on a moving conveyor screen and thermally fused together with a bonding system to maximize the strength and surface stability of the fabric.

One method of suspending the solidifying polymer within the fabric is accomplished by adding it to the mix of raw petro-chemical based pellets, pigments and additives, melting the mixture and extruding filaments from the mixture. This method incorporates the polymer into the body of the filaments as they are formed.

The solidifying polymer is also suspended within the fabric by injecting an evenly distributed amount of the polymer into the web of filaments at an intermediate point on the moving conveyor screen as the filaments are formed into a web. As the filaments are thermally bonded into a piece of fabric, the solidifying polymer is trapped within the web of filaments, becoming a component of the finished textile fabric material.

The solidifying polymer can also be attached to the textile material by using an adhesive to bond an evenly distributed, measured amount of the polymer to a layer of textile material.

Certain re-cycled plastic materials can be mixed with the pellets, pigments and additive components that form the filaments of the textile material, utilizing the re-cycled plastic components in an effective pollution control device and eliminating them from landfill disposal.

The textile material, holding the polymer within its web of filaments or bonded to the polymer with an adhesive, are stratified in layers between two layers of textile material that form the outer envelope of the pillow and seamed within the periphery of the outer envelope of the pillow. Longitudinal and lateral seams are then added to the pillow to produce the desired quilting effect.

In each instance, the solidifying polymer is stratified and arranged between layers of textile material within the pillow formed by the outer envelope, with additional seams providing a quilting effect for the entire pillow.

The quilting of the pillow creates a series of continuous consolidation points of the internally stratified layers of textile material within the pillow envelope. The textile material absorbs the spilled or leaked liquid hydrocarbons on contact. This action, coupled with the continuous consolidation points of the internal and external layers of textile material and the unique stratification design of the chambered pillow speeds migration of the liquid hydrocarbons through the flow channels created by the quilting seams throughout the interior of the pillow via the capillary attraction of the liquid hydrocarbons to the textile material. The result is a uniform distribution of the liquid hydrocarbons throughout the entire structure of the pillow for absorption and solidification of the liquid hydrocarbons by the alternating layers of solidifying polymer within the stratified layers of the pillow.

Typically, the density and weight of the internal layers of stratified, textile material is substantially less than the density and weight of the textile material used to form the outer envelope of the pillow. This is done to reduce the volume of liquid hydrocarbons that may be retained within the textile material segments of the pillow in the event the volume of the spill the pillow is being used to sorb is in excess of the capacity of the solidifying polymer within the pillow. Pillows fabricated of thinner textile materials of less dense construction characteristically retain a smaller volume of liquid hydrocarbons within the textile material components of the pillow than pillows fabricated using heavier textile materials of greater density.

Chemical composition, thickness and density of the fibers utilized in the composition of a textile material play a critically governing role in controlling the rate of absorption and the ratio of retention of the liquid hydrocarbons being sorbed by the material. Textile materials formed by using a greater density of thicker fibers are sturdier, more resistant to tearing and will sorb and retain greater volumes of liquid hydrocarbons than textile materials composed of thinner fibers or formed in a less dense configuration. Thus, a heavier material is used for the outer envelope to add to the structural integrity and durability of the envelope while lighter textile material is used internally to form the stratified chambers of solidifying polymer. The migration of the sorbed liquid hydrocarbons throughout the interior of the pillow via the capillary attraction of the liquid hydrocarbons to the textile material remains a characteristic of the device, while the level of retention of the liquid hydrocarbons by the textile material diminishes.

The pillows are held in place along the dock of a fueling facility in a horizontal orientation. This results in a vessel moored at a dock to be fueled to be bordered by a system of absorbing and solidifying devices to contain and solidify any hydrocarbons spilled on to the surface of the water during the fueling operation. The pillows are attached to the edge of the fuel dock using a length of boltrope incorporated into the body of the pillows during their fabrication and a length of extrusion attached in a horizontal orientation to the side of the fuel dock at water level.

The extrusion is attached to the dock of the floating fueling facility using adhesives and/or metal fasteners to keep the channel of the extrusion in place in a parallel, horizontal orientation at the surface of the water.

The boltrope is sewn into the outer envelope of the pillow. The rope portion of the boltrope is placed in the fold of the non-woven fabric comprising the outer envelope, where it is seamed tightly into the fold of the non-woven fabric. This results in the boltrope section of the pillow having a greater diameter than the seam between the boltrope and the body of the pillow. The greater diameter of the boltrope causes the pillow to be held in place when the boltrope is placed in the channel of the extrusion while the smaller diameter of the seam between the boltrope and the body of the pillow extends through the open slit that runs the entire length of the extrusion. The boltrope will not pass through the open slit in the extrusion due to its diameter being greater than the width of the slit in the extrusion.

One end of the boltrope is placed in the open channel at the end of the extrusion, where the male cross-section of the boltrope slides through the female cross-section of the extrusion channel while the seamed area of the pillow adjacent to the boltrope is simultaneously inserted in the slit at the end of the extrusion. The pillow is slid horizontally through the extrusion with the boltrope passing through the channel extrusion and seamed area of the pillow passing through the slit of the extrusion.

Additional pillows with boltrope sewn into one side are added in a similar manner until the full length of the extrusion has pillows floating on the surface of the water along the dock of the fueling facility. Pillows held in place by the extrusion are joined in an end-to-end orientation by utilizing the grommets on each end of the pillows to prevent any gaps that may form between them. Such gaps could allow spilled or leaked hydrocarbons to flow out of the containment system.

A barrier boom of pillows, joined end-to-end and of sufficient length to surround all portions of the vessel to be fueled that are not bordered by the dock of the fueling facility, can be pulled across the surface of the water and attached to the ends of the dock, thereby completely surrounding the vessel prior to commencing fueling operations. Any hydrocarbons spilled on to the surface of the water can be "herded" to the perimeter of the barrier boom using a stream of water to propel the spill into the pillows where it can be absorbed and solidified. The portion of the barrier boom not attached to the dock area can then be retracted to allow the vessel to depart the fueling facility.

Solidified pillows can be easily extracted from the fueling area and fresh, non-sorbed pillows put in their place. Replacing the solidified pillows removes the spilled hydrocarbons from the of the water. The solidified devices can be disposed of as landfill, incinerated as a fuel or utilized as a component in the production of asphalt or other paving compounds.

BRIEF DESCRIPTION OF THE DRAWINGS

The accompanying drawings illustrate the preferred embodiments of the invention in which.

DESCRIPTION OF THE PREFERRED EMBODIMENTS

Figure 1:
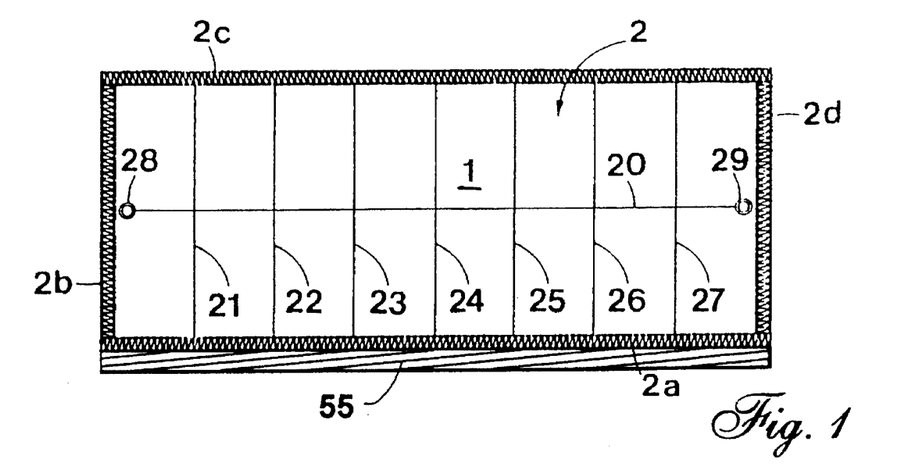
FIG. 1 is a top view of the device in accordance with the present invention.

In FIG. 1, an absorbent device 1 in accordance with the present invention is shown in a pillow-shaped configuration formed by an envelope 2 with seaming of the four sides 2a, 2b, 2c, and 2d. This seam is shown in greater detail in FIG. 3. A length of rope is sewn into the outer envelope along the entire length of side 2a, creating a length of boltrope 55 to attach the pillow to the fuel dock. A longitudinal seam 20 is shown sewn along the center axis of the pillow, and lateral seams 21, 22, 23, 24, 25, 26, and 27 are shown sewn at evenly spaced intervals from one side of the pillow to the opposite side of the pillow and crossing the longitudinal seam along the center axis seam of the pillow in a perpendicular orientation. These seams are shown in greater detail in FIG. 4. Grommets 28 and 29 are placed on the longitudinal seam along the center axis seam of the pillow on each end of the pillow to serve as a connecting point with other pillows to form a continuous boom.

Figure 2:
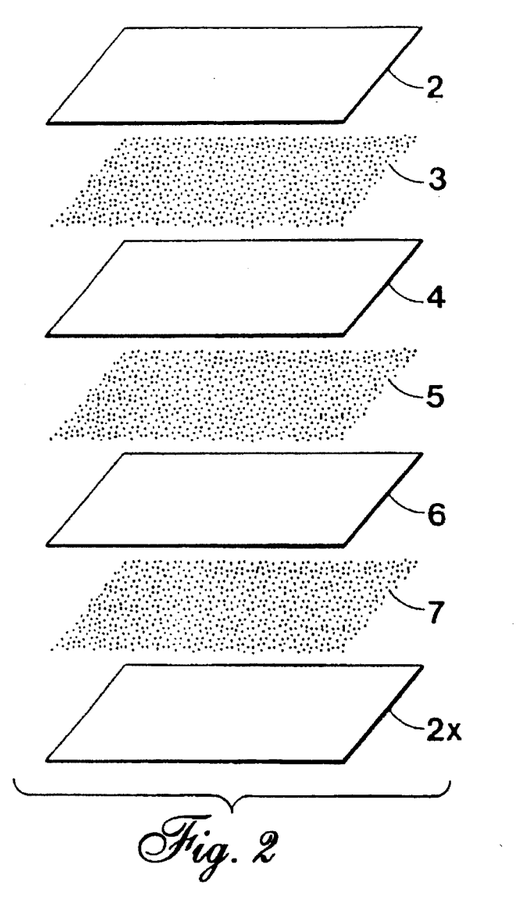
FIG. 2 is an exploded illustration of the first embodiment of the device.

FIG. 2 is an exploded illustration of the first embodiment of the device in FIG. 1, showing alternating layers of textile material 4 and 6 and solidifying polymer 3, 5, and 7 in a stratified arrangement between the layers of textile material 2 and 2x comprising the outer envelope of the device.

Figure 3:
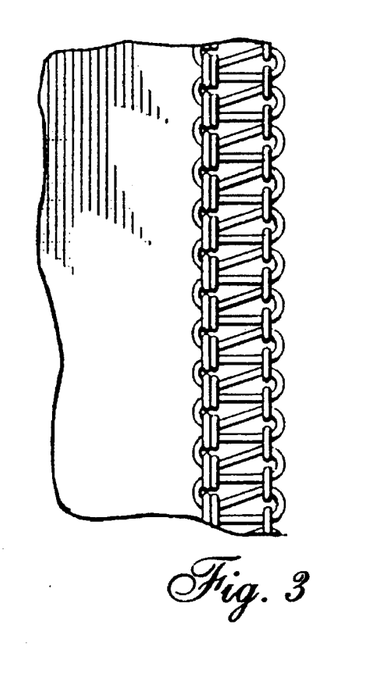
FIG. 3 shows the detail of the overlock seam.
Figure 4:
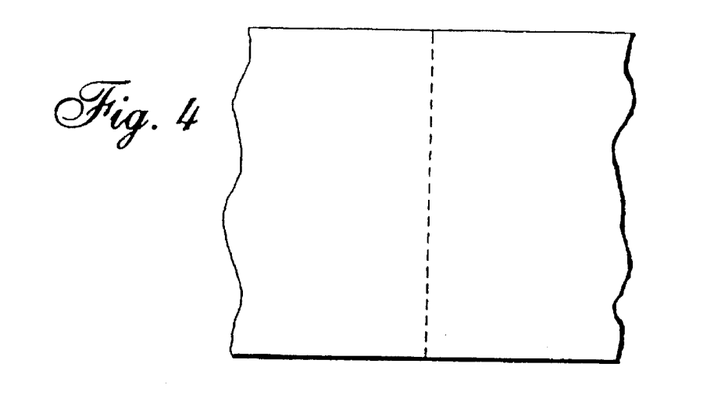
FIG. 4 shows the detail of the seam used to consolidate the internally stratified layers of textile material with the outer envelope of the device in FIG. 2.
Figure 5:
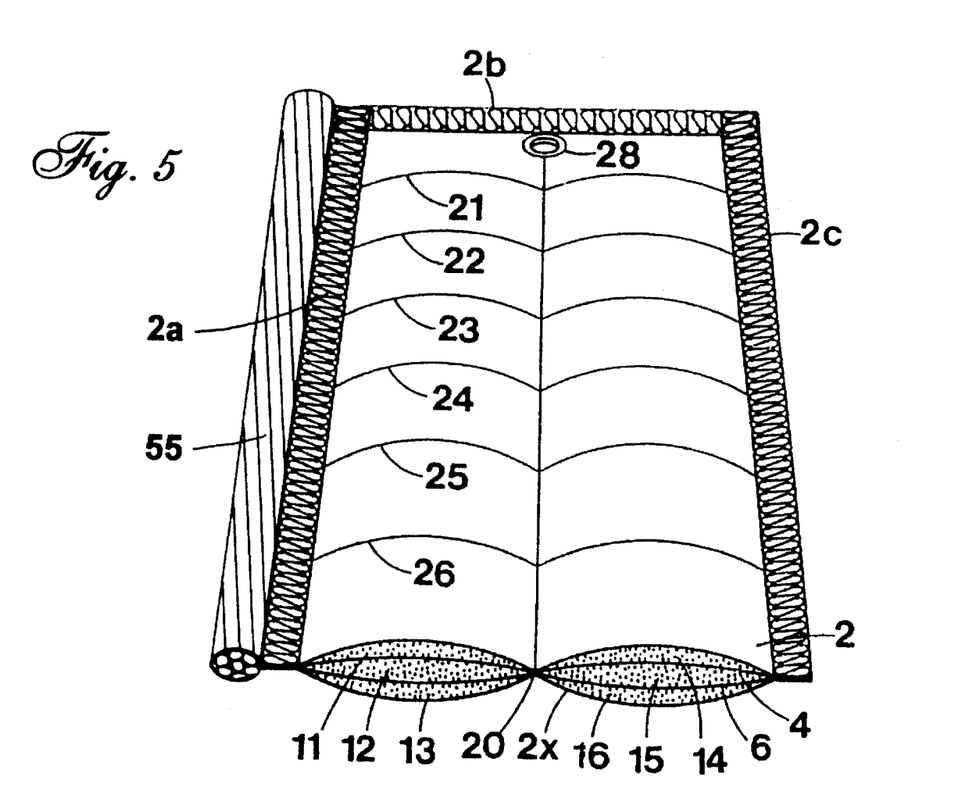
FIG. 5 shows a cross section of the first embodiment of the device.

Referring to FIG. 5, the cross-section of the first embodiment of the pillow prior to closure at seam 2d reveals the stratification design of the pillow achieved by stacking pieces of textile material 2, 4, 6, and 2x and seaming them at points 2a, 2b and 2c using the overlock seam illustrated in FIG. 3. The cross-section of the boltrope portion of the pillow 55, created by sewing a length of rope into the outer envelope, is shown along seam 2a. The resulting pockets are arranged one on top of another and enclosed by a common outer envelope of layers 2 and 2x. Next, a seam 20 is sewn along the center axis of the pillow, providing a line of additional consolidating points of the internally stratified layers of textile material with the outer envelope of the pillow along its longitudinal axis and creating two columns of pockets 11, 12, and 13 and 14, 15, and 16 within the device. FIG. 5 shows the effect of alternate multi-layering of textile material layers 2, 4, 6 and 2x and the consolidation of the layers along seams 2a, 2b, 2c and 20 to form pockets 11, 12, 13, 14, 15, and 16. These pockets are then filled with polymer and sealed into the body of the pillow, resulting in an arrangement of stratified polymer-filled chambers.

The polymer is inserted into the device by placing a measured amount of the polymer in each pocket at the open end of the device and allowing the polymer to drop through the pockets until it is contained by seam 2b. The polymer is then sealed in the pockets with lateral seam 21, sewn from seam 2a to seam 2c and crossing seam 20 at a perpendicular angle. Seam 21 seals the polymer into chambers and creates an additional line of consolidation points of the layers of textile material. The sealing of the polymer into chambers results in an even distribution of the polymer throughout the device as it prevents loose polymer from migrating throughout the body of the device and clustering in a few areas.

The filling process is repeated, allowing the polymer to drop through the pockets until it is contained by seam 21 with seam 22 sewn to form the next section of stratified polymer-filled chambers. The process is repeated until the last section of pockets is filled with polymer. The last section of polymer-filled chambers and the pillow is seamed shut by seam 2d.

The internally stratified layers of textile material are consolidated with the outer envelope of the pillow at the seams 2a, 2b, 2c and 2d around the perimeter of the pillow, and at seams 20, 21, 22, 23, 24, 25, 26, and 27 along the longitudinal and lateral axes of the device. This allows liquid hydrocarbons that come in contact with the outer envelope layers of textile material 2 and 2x to migrate via the seams 2a, 2b, 2c, 2d, 20, 21, 22, 23, 24, 25, 26, and 27 under capillary attraction to the interior layers of textile material 4 and 6 and propagate throughout the pillow.

In accordance with the first embodiment directed to containment sumps and the like, the pillow envelope 2 measures 48"×6"×½". Each pillow chamber contains approximately 8 grams by weight of the solidifying polymer material for an approximate total weight of 1008 grams of polymer in the pillow. The textile material is preferably a petro-chemical based fabric such as polypropylene, polyester or nylon. The polymer material is preferably an organic elastomer polymer sold under the trademarks Waste-Set 3200, Waste-Set 3400, Nochar A610, Nochar A650, Enviro-Bond 403, Norsorex APX1, H-100 Environmental Spill Encapsulant or an equivalent.

Figure 6:
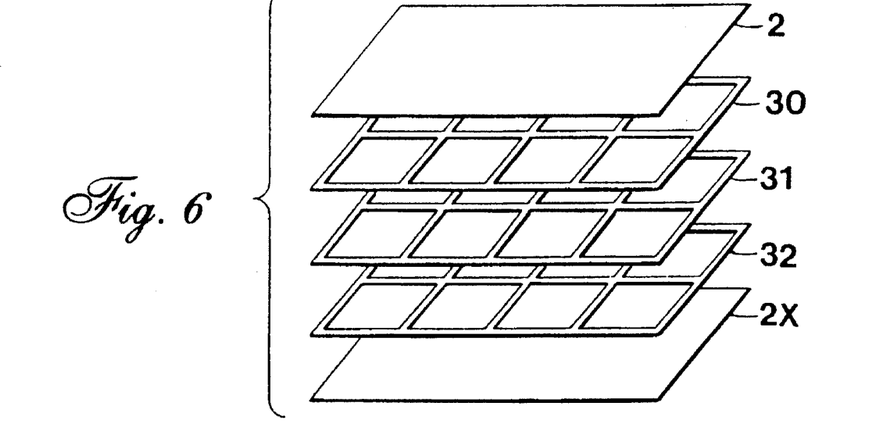
FIG. 6 is an exploded illustration of a second embodiment of the device.

FIG. 6 is an exploded illustration of the second embodiment of the device in FIG. 1, showing stratified layers of individual polymer-filled bags 30, 31 and 32 in a stratified arrangement between the layers of textile material 2 and 2x comprising the outer envelope of the device.

Figure 7:
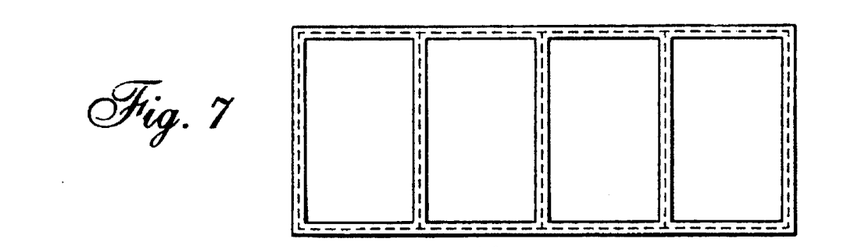
FIG. 7 shows a series of polymer-filled and sealed bags.
Figure 8:
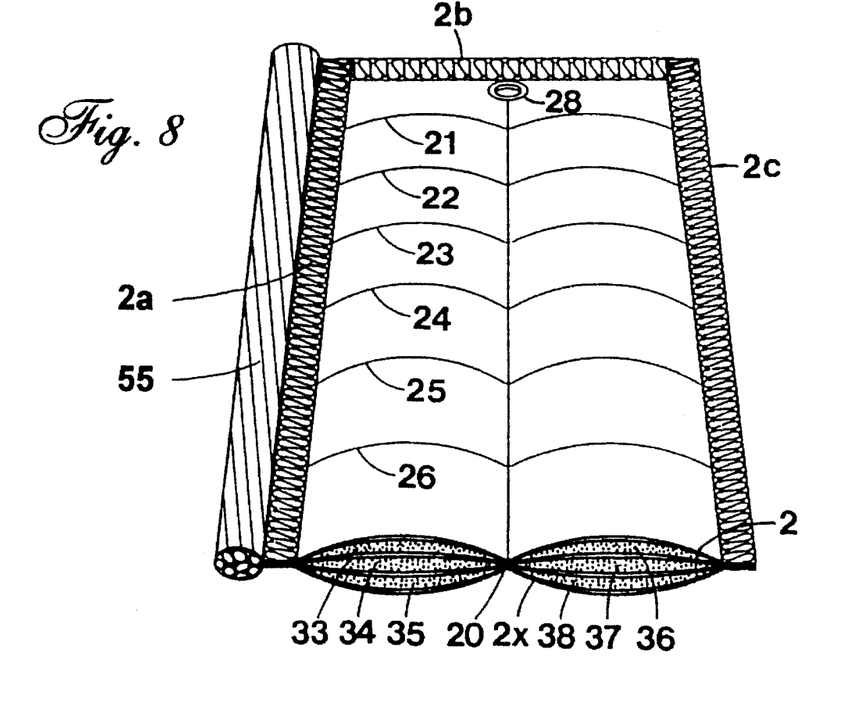
FIG. 8 shows a cross section of the second embodiment of the device.

Referring to FIG. 7, a series of polymer-filled and sealed bags of single layer textile material are shown joined by ultra-sonic seams. This method of seaming is used to encase the polymer in each of the individual bags, to seal the stratified layers of individual polymer-filled bags within the outer envelope of textile material along the perimeter of the pillow and to create the consolidation seams of the outer envelope of textile material with the substantially registered junctions of the stratified layers of individual polymer-filled bags of the device in FIG. 6;

Referring to FIG. 8, the cross-section of the second embodiment of the device prior to closure at seam 2d reveals the stratification design of the pillow achieved by stratifying layers of individual polymer-filled bags 33, 34, 35, 36, 37 and 38 between outer envelope layers of textile material 2 and 2x. The ultra-sonic seam illustrated in FIG. 7 is used to consolidate the outer edges of the internal layers of polymer-filled bags with the outer edges of the textile material forming the outer envelope of the device along seams 2a, 2b and 2c. The cross-section of the boltrope portion of the pillow 55, created by sewing a length of rope into the outer envelope, is shown along seam 2a. Seam 20 is sewn along the center axis of the pillow and seams 21, 22, 23, 24, 25, 26 and 27 are sewn laterally across the pillow to consolidate the outer envelope layers with the internal layers along the junctions of the substantially registered stratified layers of individual polymer-filled bags.

FIG. 8 shows the effect of the stratified layering of individual polymer-filled bags 33, 34, 35, 36, 37 and 38 between the outer envelope layers of textile material 2 and 2x and the consolidation of the layers along seams 2a, 2b, 2c and 20 22, 23, 24, 25 and 26 to form an arrangement of polymer-filled chambers within the body of the device. The internally stratified layers of individual polymer-filled bags are consolidated with the outer envelope of the pillow at the seams 2a, 2b, 2c and 2d around the perimeter of the pillow, and at seams 20, 21, 22, 23, 24, 25, 26, and 27 along the longitudinal and lateral axes of the device.

These seams allow liquid hydrocarbons that come in contact with the outer envelope layers of textile material 2 and 2x to migrate via the seams 2a, 2b, 2c, 2d, 20, 21, 22, 23, 24, 25, 26, and 27 under capillary attraction to the interior layers of individual polymer-filled bags 33, 34, 35, 36, 37 and 38 and propagate throughout the pillow.

In accordance with the second embodiment directed to containment sumps and the like, the pillow envelope 2 measures 48"×6"×½". Each pillow chamber contains approximately 12 grams by weight of the solidifying polymer material for an approximate total weight of 576 grams of polymer in the pillow. The textile material is preferably a petro-chemical based fabric such as polypropylene, polyester or nylon. The polymer material is preferably an organic elastomer polymer sold under the trademarks Waste-Set 3200, Waste-Set 3400, Nochar A610, Nochar A650, Enviro-Bond 403, Norsorex APX1, H-100 Environmental Spill Encapsulant or an equivalent.

Figure 9:
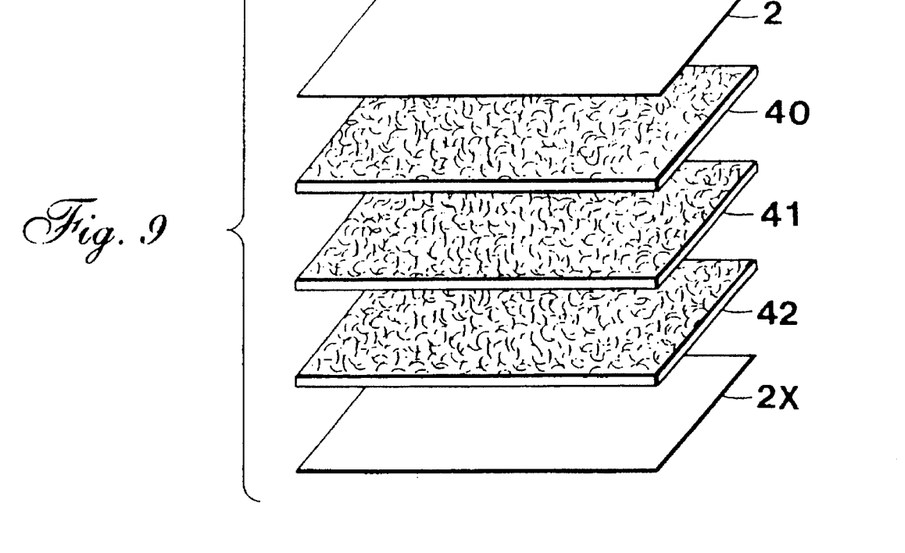
FIG. 9 is an exploded illustration a third embodiment of the device.

FIG. 9 is an exploded illustration of the third embodiment of the device in FIG. 1, showing layers of solidifying polymer suspended in textile material 40, 41 and 42 in a stratified arrangement between the layers of textile material 2 and 2x comprising the outer envelope of the device.

Figure 10:
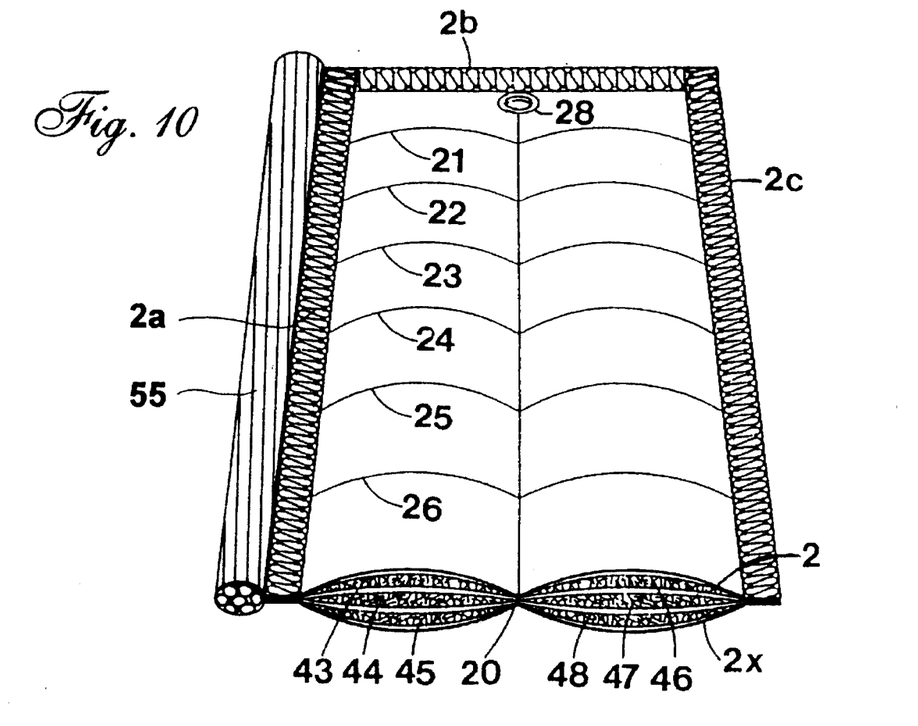
FIG. 10 shows a cross section of the third embodiment of the device.

Referring to FIG. 10, the cross-section of the third embodiment of the device prior to closure at seam 2d reveals the stratification design of the pillow achieved by stratifying layers of polymer suspended in textile material 43, 44 and 45 between outer envelope layers of textile material 2 and 2x and seaming them at points 2a, 2b and 2c using the overlock seam illustrated in FIG. 3. The cross-section of the boltrope portion of the pillow 55, created by sewing a length of rope into the outer envelope, is shown along seam 2a. Seam 20 is sewn along the center axis of the pillow, providing a line of additional consolidating points of the internally stratified layers of polymer suspended in textile material with the outer envelope of the pillow along its longitudinal axis and creating two columns of internally stratified layers of polymer suspended in textile material 43, 44 and 45, and 46, 47 and 48 within the device. FIG. 10 shows the effect of the stratified layering of polymer suspended in textile material 43, 44 and 45, and 46, 47 and 48 between the outer envelope layers of textile material 2 and 2x and the consolidation of the layers along seams 2a, 2b, 2c and 20, 21, 22, 23, 24, 25 and 26 to form an arrangement of polymer-filled chambers within the body of the device.

These seams allow liquid hydrocarbons that come in contact with the outer envelope layers 2 and 2x to migrate via the seams 2a, 2b, 2c, 2d, 20, 21, 22, 23, 24, 25, 26, and 27 under capillary attraction to the interior stratified layers of polymer suspended in textile material 43, 44 and 45, and 46, 47 and 48 and propagate throughout the pillow.

In accordance with the third embodiment directed to containment sumps and the like, the pillow envelope 2 measures 48"×6"×½". Each layers of polymer suspended in textile material contains approximately 128 grams by weight of the solidifying polymer material for an approximate total weight of 384 grams of polymer in the pillow. The textile material is preferably a petro-chemical based fabric such as polypropylene, polyester or nylon. The polymer material is preferably an organic elastomer polymer sold under the trademarks Waste-Set 3200, Waste-Set 3400, Nochar A610, Nochar A650, Enviro-Bond 403, Norsorex APX1, H-100 Environmental Spill Encapsulant or an equivalent.

Figures 11, 12:
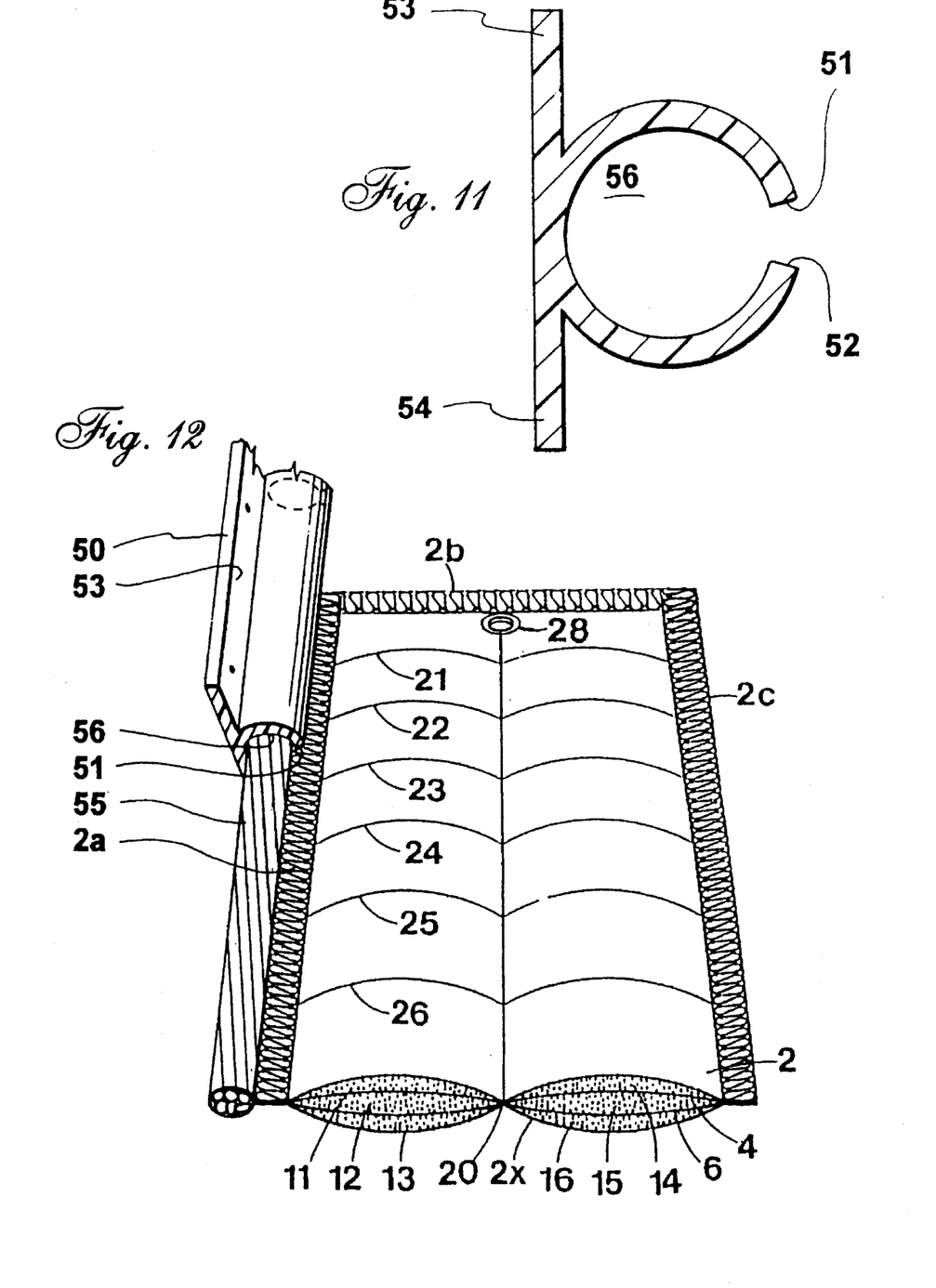
FIG. 11 shows a cross-section of the extrusion.
FIG. 12 shows an oblique view of the pillow being held in place by the extrusion.

FIG. 11 is a cross-section of the extrusion used to hold the pillows in place on the water's surface around the edges of the fuel dock. The channel 56, is of a sufficient diameter to accommodate the boltrope sewn into the outer envelope of the pillows. The opening on the outer side of the channel, running the length of the extrusion between edges 51 and 52, allows the seam between the body of the pillow and the boltrope to pass through the extrusion as it is being slid into place. Vertical tabs 53 and 54 are used to secure the extrusion to the dock and finger piers sections of the fuel slip.

Referring to FIG. 12, a pillow 1 is shown being placed in a length of extrusion 50. The boltrope portion of the pillow 55 is placed inside the channel of the extrusion 56, with seam 2a of the pillow passing through the open slit in the extrusion found between edges 51 and 52. The length of extrusion 50 is attached to the dock at the waterline level by drilling holes in tabs 53 and 54 and placing fasteners through the holes and bolting the extrusion to the dock.

Figure 13:
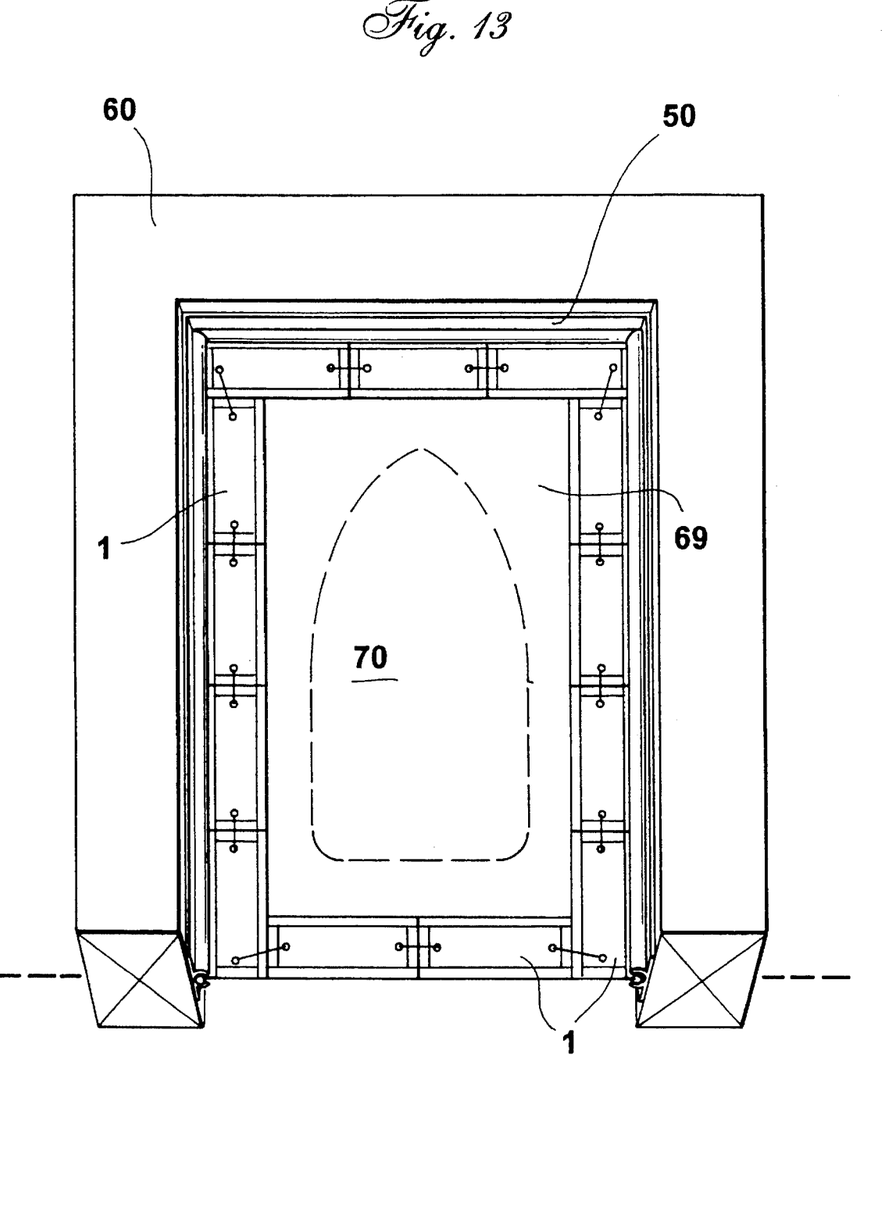
FIG. 13 shows a vessel in a fueling slip.

FIG. 13 is a view of a vessel 70 moored in the fuel slip. The vessel is surrounded by an arrangement of pillows 1 held in place on the surface of the water 69 by lengths of extrusion 50 attached to the dock 60. A chain of solidifying pillows 1, is shown in place on the surface of the water 69 across the open end of the fuel slip.

Ambient temperature and the viscosity of the liquid hydrocarbon to be solidified are the two most critical factors in determining the rate of absorption and the amount of time required to solidify the broad spectrum of liquid hydrocarbons this invention is designed to contain for removal and disposal. To enhance the polymer's effective interaction with pollutants, the pillow's construction utilizes the layering of polymer material and textile material to control the rate of absorption and solidification.

The effectiveness of the pillow is further enhanced with the addition of quilting seams. A longitudinal seam 20 along the center axis of the pillow and lateral seams 21, 22, 23, 24, 25, 26 and 27 perpendicular to the center axis of the pillow provide consolidation points of the internally stratified layers of textile material with the external textile material envelope and forms chambers within the pillow. The consolidation of the internal layers of textile material within the outer envelope speeds migration of the liquid hydrocarbons throughout the interior stratified layers of the pillow via the capillary attraction of the liquid hydrocarbons to the textile material. The lateral seams may also be oriented at an oblique angle to the center axis of the pillow. In either case, a quilted effect is achieved. Also, instead of a longitudinal center axis seam, a plurality of parallel longitudinal seams could be used. Further, the quilting effect may be achieved using a plurality of seams criss-crossing at oblique angles to one another so as to form the pockets in a diamond-shape rather than square or rectangular shapes.

The stratification design allows for optimum efficiency in utilizing the solidifying properties of the polymer. Very light viscosity liquid hydrocarbons react almost instantaneously with the polymer and are exposed to no more polymer than can be fully utilized for absorption and solidification. Stratification promotes rapid migration of light viscosity liquid hydrocarbons throughout the interior of the pillow, while slowing migration of the liquid hydrocarbons through the outer surface envelope area and exposure to the polymer. The extremely rapid reaction between the light viscosity liquid hydrocarbon and the polymer could otherwise result in the loose polymer located within the volume of the pillow being surrounded by a non-permeable, rubber-shell. The resulting surface blockage would thereby prevent the enclosed polymer from being used to solidify additional liquid hydrocarbons.

In addition, the stratification design allows the heavier viscosity liquid hydrocarbons that migrate through the layers of textile material to be suspended inside the pillow awaiting the polymer to absorb them and begin the solidification process.

The properties of the textile material that allow for rapid absorption and migration of all viscosities of liquid hydrocarbons effectively give the device maximum surface area exposure of the polymer through the stratification design.

Additional applications include, but are not limited to, removal of liquid hydrocarbons from bilges of marine vessels, monitor wells, electric utility transformers, petrochemical plants and pipelines, aviation fueling facilities and rail and trucking fueling terminals as well as use as a containment and clean-up product for municipal entities charged with eliminating petrochemical spills.

The foregoing description of the preferred embodiment has been for the purpose of explanation and illustration. It will be appreciated by those skilled in the art that many modifications and changes can be made in the structure without departing from the essence of the present invention. Therefore, it is contemplated that the appended claims will cover any modifications or embodiments which fall within the scope of the invention.

What is claimed is:

1. A barrier boom for a marine vessel fueling facilities proximate a docking area comprising:

a plurality of absorbent devices joined end-to-end to float in the water and surround a marine vessel berthed within the docking area;

each absorbent device being a body having an outer envelope layer of textile material with a section of boltrope integrated into the body of the outer envelope along one edge with a plurality of chambers formed within said outer envelope in stratification therein by internal layers of textile material with a polymer material disposed within the stratified chambers of the envelope having a characteristic of substantially absorbing and solidifying liquid hydrocarbon substances that come in contact with the device, said polymer being sealed within the stratified chambers by a seam joinder of the outer envelope and the internally stratified layers of textile material and a plurality of quilting seams defining a multiplicity of hydrocarbon absorption consolidation points therein and subdividing each stratified chamber into a distinct hydrocarbon absorption unit within the device; and each absorbent device further including means attached to the outer envelope for securing adjacent absorbent devices together.

2. The barrier boom of claim 1 wherein said means for securing adjacent absorbent devices together comprises a grommet carried at each end of the absorbent device.

3. The barrier boom of claim 1 wherein each absorbent device has an elongated configuration.

4. The barrier boom of claim 1 wherein each absorbent device further included means attached to the outer envelope for securing the device to a section of the dock area.

5. The barrier boom of claim 1 wherein the means for securing the absorbent device to the dock area is a section of boltrope adapted to be placed within a section of channel carried by the dock area.

6. The barrier boom of claim 1 wherein said plurality of quilting seams includes:

at least one seam located on or parallel to the longitudinal center axis of the absorbent device; and a plurality of seams extending across the absorbent device from one side to the opposite side and crossing the longitudinal center axis.

7. The barrier boom of claim 1 wherein each absorbent device is rectangular and a seam joinder of the outer envelope and the internally stratified layers of textile material extends along four contiguous sides.

8. The barrier boom of claim 1 wherein the polymer material is an organic elastomer polymer.

9. The barrier boom of claim 1 wherein:

the quilting seams comprise a series of seams, at least one of which is located on or parallel to the longitudinal center axis of the device and others extending across the device from one side to the opposite side and crossing the center axis of the device; and wherein each device further includes a seam joinder of the peripheries of the outer envelope and the stratified internal layers of textile material to promote migration of liquid hydrocarbons under capillary attraction to the interior of the device.

10. The barrier boom of claim 1 wherein said internal layers are stacked; and wherein each device further includes a seam joinder of the outer envelope and the stacked layers around the periphery of the outer envelope.

11. The barrier boom of claim 1 wherein:

a plurality of stacked layers of individual polymer-filled bags within the outer envelope form said plurality of internal stratified hydrocarbon absorption and solidification chambers, the bags being arranged side-by-side in a matrix in each stacked layer; and a pattern of seams placed in the outer envelope so as to be in substantial registration with the side-by-side intersections of the individual polymer-filled bags form said quilting seams.

12. The barrier boom of claim 11 further comprising a seam joinder of the outer envelope and the stacked layers of bags around the periphery of the outer envelope.

13. The barrier boom of claim 1 wherein:

said internal layers are stacked and the polymer material is suspended within the fibers of the textile material; and wherein said quilting seams include a series of seams, at least one of which is located on or parallel to the longitudinal center axis of the envelope and others of which extend across the device from one side to the opposite side and cross the center axis of the envelope.

14. The device of claim 13 further comprising a seam joinder of the outer envelope and the internally stratified layers around the periphery of the outer envelope and the stratified layers.

15. A method of containing, collecting and removing hydrocarbons from the surface of the water proximate a marine fueling facility of a dock area, comprising the steps of:

providing a plurality of absorbent devices, each device having an outer envelope layer of textile material, a plurality of chambers formed in stratification therein by internal layers of textile material with a polymer material disposed within the chambers of the device having a property of acting to absorb and solidify liquid hydrocarbon substances coming into contact with the device and migrating to its interior, and a plurality of quilting seams formed in the device to define hydrocarbon absorption consolidation points within the device and establish the chambers as distinct hydrocarbon absorption units within the device;

placing a first group of the absorbent devices end-to-end along the dock portion at the water level thereof to form a continuous barrier of absorbing and solidifying devices along the edge of the dock;

placing a second group of the absorbent devices end-to-end to surround all portions of a vessel at a fueling facility not bordered by a section of the dock area equipped with the first group of absorbent devices and form a floating barrier of absorbing and solidifying devices on the surface of the water, said second group of devices being connected to said first group of devices so as to effectively surround a vessel at the fueling facility with a continuous absorbing and solidifying barrier.

16. The method of claim 15 further comprising the steps of:

removing an absorbent device containing solidified hydrocarbons;

replacing the absorbent device containing solidified hydrocarbons with a fresh absorbent device having a capacity to absorb and solidify hydrocarbons; and disposing of the replaced absorbent device.

* * * * *